Figure 1:
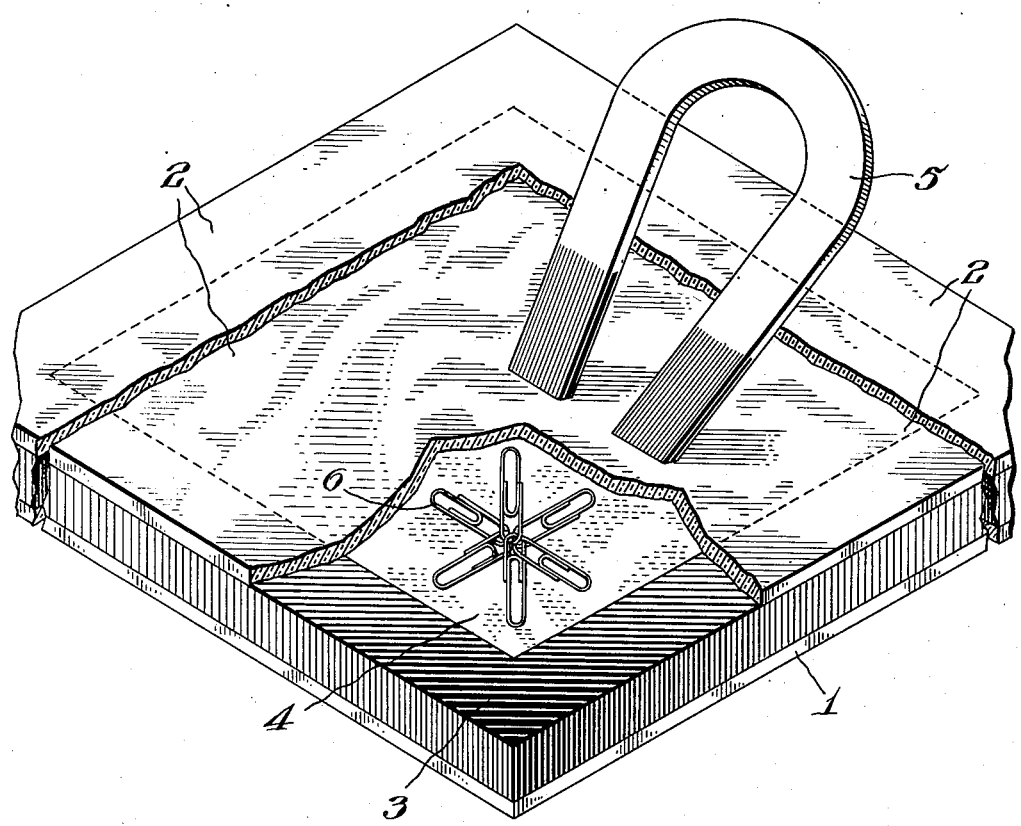

Aug. 30, 1949.

R. E. LEARY 2,480,750

PROCESS OF PREPARING CAST SYNTHETIC RESIN HAVING INTEGRAL SHEEN

Filed Nov. 19, 1947

2 Sheets-Sheet 1

INVENTOR.
RICHARD EDWARD LEARY
BY
*J. M. Lootle Jr.*
ATTORNEY

Patented Aug. 30, 1949

2,480,750

UNITED STATES PATENT OFFICE 2,480,750

PROCESS OF PREPARING CAST SYNTHETIC RESIN HAVING INTEGRAL SHEEN

Richard Edward Leary, Newark, N. J., assignor to E. I. du Pont de Nemours & Company, Wilmington, Del., a corporation of Delaware Application November 19, 1947, Serial No. 786,924

10 Claims. (Cl. 18—58)

This invention relates to the preparation of cast synthetic resin and, more particularly, to the preparation of such resin in the form of sheets and bodies of other shapes having integral sheen.

The term "integral sheen" is used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation within the material of lamellae (flat plates, crystals, and the like) of substances capable of reflecting light. As regards appearance, the term thus includes the various types of sheen and character of sheen commonly designated, in the plastics industry, by the terms pearly, nacreous, silky, metallic, chatoyant and pearlescent.

Various substances, characterized in common by their occurrence in the form of light-reflecting lamellae, have been widely used for the purpose of imparting integral sheen to various transparent or substantially transparent plastics, such as cellulose esters and resin plastics. Such substances, including the so-called pearl essence obtained from fish scales, various inorganic and organic substitutes therefor, and metal bronzing powders, are well known in the art, as are also various methods whereby these lamellae may be brought into systematic orientation so as to yield certain desired visual effects. It is well recognized that to obtain a sheen effect light-reflecting lamellae must be positioned or oriented so that a large percentage of them lie with their broad faces parallel to each other and substantially parallel to the surface of the plastic which is to have the appearance of sheen.

For years cellulose nitrate stock having integral sheen has been used in the manufacture of fountain pens, pencils and the like. Such stock is obtained by various casting, extruding, and layup techniques disclosed in numerous patents. More recently, synthetic resins having integral sheen have been obtained by the incorporation of light-reflecting lamellae in polymerizable liquid organic compounds and subjecting same to polymerizing conditions in a manner that causes orientation of the light-reflecting lamellae. For example, rods and tubes of cast synthetic resin having integral sheen may be prepared by progressive polymerization along the longitudinal axis of a rod mold (Fields et al. U. S. Patent 2,168,331) or by centrifugal casting in a cylindrical mold (Clewell et al. U. S. Patent 2,265,226) of such light-reflecting lamellae-containing polymerizable compounds.

However, the production of cast synthetic resins having integral sheen has involved quite distinct problems from the production of cellulose nitrate plastics having integral sheen. Copending application U. S. Ser. No. 770,887, filed August 27, 1947 in the name of B. M. Marks deals primarily with a method for orienting lamellae in cast synthetic resin.

An object of the present invention is to provide a new and improved process of producing cast synthetic resin having integral sheen. A more particular object is to provide cast synthetic resin sheets having integral sheen and a process of producing such sheets. A further object is to provide a process of producing patterns in cast synthetic resin, such patterns resulting from the orientation of light-reflecting lamellae. Other objects will be apparent from the description of the invention given hereinafter.

The above objects are accomplished according to the present invention by mixing and suspending light-reflecting lamellae in a polymerizable liquid organic compound adapted to give a polymer solid at ordinary temperatures, introducing the resulting mixture into a mold and inserting into the mold a solid object having at least one dimension less than the least dimension of the interior of the mold and a second dimension appreciably less than a second dimension of the mold, subjecting the mold to polymerization conditions until prior to gelation the polymerizable organic compound attains such viscosity that a pattern formed by creating turbulence within the polymerizable organic compound remains permanent, moving the solid object through the polymerizable liquid organic compound thereby creating a turbulence within the polymerizable liquid organic compound, and thereafter continuing polymerization until complete.

In a preferred specific form, the invention is carried out by adding a polymerization catalyst to the mixture of lamellae and polymerizable liquid organic compound, introducing the mixture into a mold such as the widely used cells for casting sheets disclosed in Rohm et al. U. S. Patent 2,154,639, these cells usually being composed of two glass plates separated by a compressible gasket, inserting into the cell a solid object capable of being attracted by magnetic forces, such as a piece of steel rod or a number of entangled paper clips, subjecting the cell to an elevated temperature until the polymerizable organic compound attains such viscosity that a pattern formed by creating a turbulence within the polymerizable organic compound remains permanent, drawing the solid object in a random path through the polymerizable organic compound by means of magnetic forces to bring about the formation of a pearlescent "swirl" effect therein, and further continuing the exposure of the cell to an elevated temperature until the polymerization is complete.

The method of this invention is particularly adaptable for producing unique patterns of irregular character having integral sheen in cast synthetic resin. However, this method may also be used to produce geometric patterns having integral sheen depending on the type of solid object and method of movement used to orient the lamellae within the polymerizable liquid organic compound.

So far as known, it never had occurred to those skilled in the art heretofore that orientation of light-reflecting lamellae could be brought about in the manner of this invention. By the method of this invention synthetic resin sheeting exhibiting integral sheen can be produced by causing a solid object as defined hereinbefore to move about in either a random or systematic manner within the viscous polymerizable organic compound, and the resulting polymerized casting will exhibit a pattern having integral sheen in areas corresponding to the turbulence created by movement of the solid object.

Depending upon the degree of contrast or sharpness desired in the pearlescent pattern produced in synthetic resin sheeting by following the method of this invention, the orientation of these suspended lamellae to form a patterned effect having integral sheen may be brought about at various intervals within a certain viscosity range. If a sharply defined pearl effect is desired, the lamellae are oriented just prior to gelation of the polymerizable liquid organic compound. The polymerizable compound is considered to be gelled when it is no longer fluid enough to allow the unobstructed passage of a solid object therethrough. Pearlescent patterns of lesser gradations of contrast may be obtained by orienting the lamellae at correspondingly lower viscosities until such a viscosity is reached at which a pattern completely fades upon completion of the polymerization.

Depending upon the weight and bulk of the agitator used to set up a turbulence within the polymerizable liquid and the strength of the source of the magnetic force used, some difficulty may be encountered in orienting the lamellae at higher viscosities if, for example, a rather weak magnet is used with a weighty agitator. These variables should be kept in mind when the desired gradation of contrast in the pearlescent patterns is being considered.

Since it is not convenient in this process to measure the actual viscosity of the polymerizable liquid organic compound to determine when the turbulence should be created, such measurements are not particularly helpful. However, such measurements can be made and it has been found that a viscosity of at least 40 poises at room temperature is normally necessary before a pattern formed by creating a turbulence will remain substantially permanent. Since the resumed polymerization at elevated temperature may be anywhere from 30° C., slightly above room temperature, to 90° C., the specific temperature selected will be to a certain degree a factor for consideration. That is, if a temperature near the top of the range is used, there will be some reduction in the viscosity of the polymerizable syrup before the polymerization reaction builds up the viscosity again to what it was at room temperature and, hence, there will be more tendency for the definition of the pattern to fade or be lost than would be the case if the resumed polymerization were to be at a temperature at the lower end of the range. Offsetting this, some loss of definition of pattern is frequently desired to obtain a subdued gradation of contrast in the pearlescent pattern.

Above a viscosity of 400 poises at room temperature, gelation of the polymerizable organic compound has commenced so that it is impractical to attempt to effect orientation above this viscosity. In practical operation, the solid object inserted in the mold may be moved in one corner of the mold and the result observed, an operator quickly learning to judge from such observation whether the syrup has reached the viscosity to give the particular effect desired.

Figure 2:
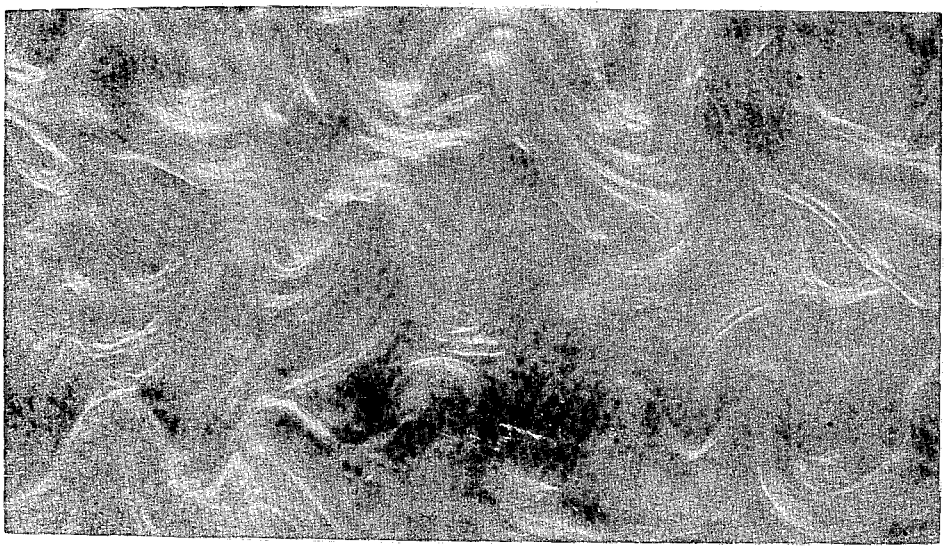

The manner of carrying out this invention will be more particularly described with reference to the accompanying drawing wherein:

Fig. 1 is a perspective view, more or less diagrammatic, of an apparatus for carrying out the present invention, parts being broken away for purposes of illustration; and Fig. 2 is a photographic elevation of the face of a square section of a cast sheet made by the apparatus shown in Fig. 1.

Referring to Fig. 1, there is shown in horizontal position a cell assembly for the casting of sheets. This cell is composed of glass plates 1 and 2 separated by a compressible gasket 3. Disposed in the cell is the polymerizable liquid organic compound 4 containing suspended light-reflecting lamellae and a polymerization catalyst. It will be appreciated by those skilled in the art that the lamellae are not oriented at this stage and because the broad faces of the lamellae are disposed at random, there is no sheen effect at all. It is only by the orientation of the lamellae so that a great majority in any particular area face substantially parallel to the surface of the casting that a sheen effect is attainable.

A horseshoe magnet is designated by the reference numeral 5, this or some other form of magnet being used to effect the movement of an agitator 6 which is inserted into the contents of the cell. The particular agitator 6 illustrated in Fig. 1 is a number of entangled paper clips. It is to be understood, that the use of magnetic forces for bringing about the movement of the agitator within the contents of the cell is only a preferred specific means, and any convenient means for effecting the movement of the agitator may be used. For example, when a weighty agitator is used, the cell may be rocked from side to side to facilitate movement. It is also important to note, that any type of agitator can be used so long as it can be readily moved within the contents of the cell and conforms to the specified general dimensions as given hereinbefore and, obviously, has sufficient mass so that its movement will cause some appreciable turbulence.

Polymerization of the cell contents is initiated by thermal energy as, for example, by placing the cell in a water bath or air oven, and polymerization is allowed to proceed until the polymerizable liquid organic compound attains such viscosity that a pattern formed by creating a turbulence within the viscous liquid remains permanent upon continuation of the polymerization. The magnet 6 is then moved across the outer surface of the cell in a random manner to create a pearlescent swirl corresponding to the turbulence set up by movement within the viscous liquid. The agitator is thereafter attracted to a corner of the cell in order that it may be removed from the finished sheet during the trimming operation, and polymerization of the cell contents is then continued in the water bath or even until complete. As shown in Fig. 2, the cast sheet exhibits integral sheen in random areas in the form of a swirl corresponding to the turbulence set up by the random movement of the agitator, this swirl effect or pattern, never heretofore obtained, being strikingly characteristic of the integral sheen resulting from this procedure.

In order to maintain a uniform dispersion of the lamellae the polymerizable liquid organic compound should have a viscosity within the range of 5 to 50 poises at room temperature. In syrups having viscosities lower than 5 poises, there is a tendency for the larger particles of lamellae to settle out and, consequently, a pattern would be produced on only one side of the sheet. However, syrup of such viscosities can be used when such an effect is desired.

The following examples wherein all proportions are given by weight unless otherwise specified, illustrate specific embodiments of the present invention.

Example I

Monomeric methyl methacrylate containing 0.0029% of lauroyl peroxide as a polymerization catalyst, was heated at 70° C. until it thickened to a syrup having at room temperature a viscosity of about 10 poises. Using this syrup the following formulation was prepared:

| | Parts |
|---|---|
| Methyl methacrylate syrup | 4250 |
| Paispearl paste (a paste of pearl essence from fish scales dispersed in cellulose nitrate solution) | 47 |
| Pink pigment | 0.0047 |
| Alpha,alpha'azobis(alpha,gamma,dimethylvaleronitrile) | 0.085 |

After thorough mixing, the above formulation was poured into a conventional sheet casting cell composed of two plates of glass ¼" thick and an interposed compressible gasket adapted to give a finish cast sheet ¾" in thickness. Before the cell was sealed a number (10) of entangled paper clips was inserted into the cell.

The loaded cell was then placed in a water bath maintained at a temperature of 54° C. for a period of 1 hour and 50 minutes. At the end of this period, the cell was removed from the water bath, and orientation of the lamellae was brought about by dragging the entangled paper clips through the viscous liquid contents of the cell by means of magnetic forces exerted upon the clips from a horseshoe magnet. The magnet was held flush against the surface of the glass, moved in a circular manner and at the same time pulled along so as to form a wavy or swirl pattern in the viscous liquid. The paper clips were then attracted to one corner of the cell. Upon formation of the pearlescent swirl effect within the polymerizable liquid organic compound, the cell was returned to the water bath for a period of 12 hours to complete the polymerization.

The finished sheet exhibited a pearlescent swirl pattern as illustrated in Fig. 2, the pearlescent effect being distributed in random areas corresponding to the areas agitated by the paper clips. The orientation of the lamellae was brought about by the turbulence produced. The alpha,alpha'-azobis(alpha,gamma,dimethylvaleronitrile) is a polymerization catalyst which supplements the lauroyl peroxide, the latter being used in very small amounts and being substantially used up in the thickening of the syrup.

Example II

Monomeric methyl methacrylate containing 0.002% benzoyl peroxide as a polymerization catalyst was heated at 70° C. until it thickened to a syrup having at room temperature a viscosity of about 4 poises. Using this syrup the following formulation was prepared:

| | Parts |
|---|---|
| Methyl methacrylate syrup | 4250 |
| Blue pigment | 0.037 |
| Paispearl paste | 47 |
| Alpha,alpha'azobis(alpha,gamma,dimethylvaleronitrile) | 0.085 |

The syrup composition was then poured into a cell as described in Example I, and an agitator consisting of a piece of stainless steel screen 16" by ¾" having two lengths of ⅛" diameter key stock silver soldered to each length of the screen, was inserted in the cell.

The cell was placed in a water bath at 54° C. for a period of 1 hour and 45 minutes. Orientation of the suspended lamellae was then brought about by moving the screen back and forth through the syrup by means of a bar magnet which was pulled across the surface of one of the cell side walls. One length of the key stock was readily attracted by the magnet while that at the other end of the piece of screen was too remote to be affected, as a result the screen was maintained in a position at right angles to the glass plates of the cell. Thereafter, the polymerization was completed in the water bath in 12 hours.

As a result of using a different type of agitator, a somewhat modified type of swirl pattern from that produced by using a number of entangled paper clips, was obtained.

Example III

Monomeric methyl methacrylate containing 0.002% of benzoyl peroxide as a polymerization catalyst, was heated at 70° C. until it thickened to a syrup having at room temperature a viscosity of about 8 poises. Using this syrup the same formulation as given in Example II was prepared except that a concentrated greenish-yellow pigment was used.

The syrup composition was then poured into a cell as described in Example I, and a 4" length of steel rod having a diameter of approximately 0.73" was inserted into the cell as an agitator. The cell was made up to produce a sheet approximately 20 inches by 20 inches and having a thickness of 0.75". This cell was placed in a vertical water bath at 54° C. for a period of 1 hour and 45 minutes. The suspended lamellae were then oriented by moving the steel rod through the syrup to produce a turbulence. Thereafter, polymerization of the syrup was completed in the water bath in 12 hours.

The swirl pattern obtained in the finished sheet was somewhat different from that obtained by using either paper clips or a screen as described in the preceding examples.

Example IV

This example illustrates the effect on the appearance of the final pattern when orientation of the lamellae was brought about at different intervals before actual gelation of the polymerizable liquid organic compound.

Monomeric methyl methacrylate containing 0.002% of lauroyl peroxide as a polymerization catalyst was heated at 70° C. until it thickened to a syrup having at room temperature a viscosity of about 11 poises. Using this syrup the following formulation was prepared:

| | Parts |
|---|---|
| Methyl methacrylate syrup | 4250 |
| Concentrated greenish-blue pigment | 0.037 |
| Paispearl paste | 47 |
| Alpha,alpha'azobis(alpha,gamma,dimethylvaleronitrile) | 0.085 |

The above syrup composition was then poured into a cell as described in Example I along with the insertion of a number (10) of entangled paper clips as an agitator. The cell was then placed in a water bath at a temperature of 54° C. for a period of 1 hour and 34 minutes. Orientation of the suspended lamellae was then brought about in the usual manner using a bar magnet to move the paper clips through the contents of the cell. Thereafter, polymerization of the syrup composition was completed in the water bath in 12 hours.

A second cell was prepared in exactly the same manner as described above, but it was maintained in the water bath for a period of 1 hour and 43 minutes before orientation of the lamellae was brought about in the usual manner. Polymerization of the cell contents was then completed in 12 hours.

The pearlescent sheet produced in the second cell which was given a slightly longer exposure to polymerizing conditions before orientation was brought about, had a slightly more pronounced pattern than did the sheet formed in the first cell. The difference, although slight, illustrates that orientation of the lamellae may be brought about at various intervals within a fairly wide viscosity range and that the pattern produced is more pronounced when the viscosity of the polymerizable organic compound is higher.

Example V

Monomeric methyl methacrylate containing 0.0029% of lauroyl peroxide as a polymerization catalyst was heated at 70° C. until it thickened to a syrup having at room temperature a viscosity of about 15 poises. Using this syrup the following formulation was prepared:

| | Parts |
|---|---|
| Methyl methacrylate syrup | 4250 |
| Paispearl paste | 47 |
| Blue pigment | 0.037 |
| Alpha, alpha' azobis (alpha, gamma, dimethylvaleronitrile) | 0.085 |

After thorough mixing, the above formulation was poured into a cell as in Example I and adapted to give a finished sheet ¾" in thickness. Before the cell was sealed a number (10) of entangled paper clips was inserted into the cell.

The loaded cell was placed in a water bath maintained at a temperature of 54° C. for a period of 1 hour and 40 minutes. At the end of this period, the cell was removed from the water bath and orientation of the suspended lamellae was brought about using a rotating magnet which was moved transversely over the surface of the cell to drag the paper clips through the polymerizable liquid and at the same time to impart a rotary movement to the clips to effect additional turbulence. The paper clips were then attracted to one corner of the cell, after which the cell was returned to the water bath for a period of 12 hours to complete the polymerization.

The finished sheet exhibited a pearlescent swirl pattern similar to that illustrated in Figure 2.

It will be understood that the above examples are merely illustrative and that the invention broadly comprises mixing and suspending light-reflecting lamellae in a polymerizable liquid organic compound adapted to give a solid polymer at ordinary temperatures, introducing the resulting mixture into a mold along with the insertion therein of an agitator such as hereinbefore described, subjecting the mold to polymerizing conditions, orienting the lamellae prior to gelation of the polymerizable organic compound, by effecting movement of the agitator by any feasible means, and then completing the polymerization.

The agitators used in the examples such as entangled paper clips, lengths of steel rod, steel screening, are only illustrative. As long as the general dimensions for the agitator conform to those given hereinbefore, any type of solid object may be used with due regard being paid to the method to be employed for moving the object within the mold contents. Obviously, if the agitator is to move by magnetic forces, and this method is preferred, it must be fabricated from magnetic materials. However, any other feasible method may be employed such as rocking the mold back and forth. The type of pattern obtained will depend to a great extent on the type of agitator used. As mentioned hereinbefore, it is necessary that the least dimension of the agitator be less than the least dimension of the interior of the mold and a second dimension of the agitator must be appreciably less than a second dimension of the interior of the mold and the third dimension of the agitator can be equal to or appreciably less than a third dimension of the interior of the mold. Needless to say, the agitator should be made of a material inert to the polymerizable liquid organic compound and should have sufficient mass and/or size to create some appreciable turbulence when moved through the polymerizable organic compound.

To form a geometric pattern the agitator must necessarily have a third dimension equal to a third dimension of the interior of the mold so that as it is moved through the contents of the mold it will always follow the same path and thereby orient suspended lamellae according to a geometric pattern. For example, if a sheet casting cell whose interior dimensions are 20" x 20" x 0.75" is used and a piece of steel plate whose dimensions are 20" x 0.73" x 0.125" and in which are stamped 0.50" squares whose centers are 0.75" apart, is used, a geometric pattern consisting of parallel lines of integral sheen would be formed when the agitator is moved through the liquid contents of the cell.

Depending upon the type of agitator to be used, it may be desirable to have a magnetic field on both sides of a mold. When an agitator such as entangled paper clips and similar objects which do not retain a stable position within the liquid contents of a mold, is used, some difficulty may be encountered in producing orientation throughout the entire thickness of the interior of the mold owing to the fact that the agitator is attracted to one side of the mold. To overcome this difficulty a magnetized steel sheet or other source of magnetic field which would cover the surface of the mold is placed on one side of mold, and a concentrated source of magnetic force in the form of a bar or horseshoe magnet or a type of rotating magnet or magnetic stirrer is used as the means of moving the agitator through the liquid. By this method the agitator is maintained in a balanced position within the liquid medium, and, consequently, orientation of the suspended lamellae is brought about throughout the entire volume of the liquid contents of the mold. A less efficient method is to use just the concentrated magnetic force, and to repeat the orienting procedure on both sides of the mold to ensure complete orientation throughout the entire volume of the liquid contents of the mold.

In the present invention a type of swirl pearlescent pattern is substantially reproduced, providing all other conditions are the same, by using the same type of agitator for orienting the lamellae and moving the agitator through the liquid contents of a mold in substantially the same general configuration. This, however, only applies to random patterns and not geometric patterns. Obviously, for reproducing geometric patterns not only the same agitator would have to be used, but the agitator would always have to be moved in exactly the same path through the contents of the mold. A great advantage of the invention, lies in the fact that an exact reproduction of a certain swirl pattern in cast resin sheeting to be used for manufacturing articles which are to be sold in matched sets such as brush backs, combs, mirrors, etc., is not necessary. Substantial reproduction of a swirl pattern is all that is necessary to make cast resin sheeting which can be used to fabricate articles to be sold as matched sets, and this is a simple operation according to the method of this invention.

The invention is manifestly applicable broadly to liquid organic compounds that may be polymerized to polymers solid at ordinary temperatures. Obviously, the invention is of greater value as applied to those compounds which give solid polymers of the most useful properties and, normally, the invention will be applied to organic compounds which give rigid castings.

A large class of liquid organic compounds adapted for use in this invention are the ethylenically unsaturated compounds which are polymerized by the action of light or heat, either alone or in admixture with one or more similar compounds. Among such compounds are the amides, esters and nitriles of acrylic, chloroacrylic and alkacrylic acids, e. g., methacrylamide, methyl acrylate, methyl chloroacrylate, methyl methacrylate, ethyl methacrylate, butyl methacrylate, ethoxyethyl methacrylate, glycol dimethacrylates, methyl ethacrylate, acrylonitrile, methacrylonitrile; other vinyl and vinylidene compounds, e. g., vinyl acetate, vinyl chloride, vinylidene chloride, vinyl ethers, styrene, methyl styrene, allyl chloride and dimethyl itaconate. Numerous other organic compounds possessing the requisite properties herein discussed will readily occur to those skilled in the art.

It is an essential part of this invention that light-reflecting lamellae be mixed with the polymerizable liquid organic compound, and such materials included under this classification are well known in the art. For example, commonly used light-reflecting lamellae include the well known pearl essence obtained from fish scales, mercurous chloride, basic lead carbonate "pearl" pigment, lead iodide in the form of light-reflecting lamellae, and numerous metal bronzing powders such as aluminum-bronze "pearl," "gold" bronze, copper-aluminum alloy bronzes and the like may be used as the light-reflecting lamellae. The amount of light-reflecting lamellae to be used will normally be within the range from 0.005% to 20%, by weight of polymerizable liquid compound, although manifestly a proportion outside this range may be used if it gives the desired effect.

Except with polymerizable compounds which are exceedingly readily polymerized, the use of a polymerization catalyst is advisable. Where polymerization is to be carried out completely by thermal means as usually would be the case, it is preferred to include in the polymerizable liquid one of the conventional thermal polymerization catalysts such as benzoyl peroxide, lauroyl peroxide, acetyl benzoyl peroxide, diacetyl peroxide, tertiary butyl perbenzoate, and such azo catalysts as alpha, alpha'-azodiisobutylonitrile or alpha, alpha'azobis(alpha,gamma,dimethylvaleronitrile) such as disclosed in Salisbury U. S. application Ser. No. 655,013. In the examples, an azo catalyst was used in conjunction with a peroxide catalyst. This combination is by no means essential in carrying out the invention but it is efficient. The peroxide catalyst is used in very low concentration and serves as the catalyst in the thickening of the monomer to a syrup but at the end of this period this catalyst is substantially used up and the azo catalyst subsequently added serves as the primary catalyst for the remainder of the polymerization reaction.

The elevated temperatures used for effecting the polymerization are those heretofore used in the art in preparing castings from these polymerizable liquid organic compounds. The optimum temperature for polymerization will vary appreciably depending upon the particular polymerizable compound, specific catalysts and proportion thereof, time cycle permissible, and the like. Nevertheless, the temperature used will in most instances be between 30° C. and 90° C.

While not preferred, the polymerization of the liquid polymerizable organic compound may be effected by actinic energy. On the other hand, it may be desirable to effect polymerization by actinic energy up to the time turbulence is created to cause formation of a pattern, and thereafter complete the polymerization by thermal energy. Obviously, this necessitates the use of a mold through which actinic energy may be transmitted and, usually, the presence of a photopolymerization catalyst. Various photopolymerization catalysts, the proportions in which they should be used, and the preferred method of irradiating the polymerizable compounds are variously disclosed in Agre U. S. Patents 2,367,660 and 2,367,661 and Howk et al. U. S. Patent 2,413,973. Suitable photopolymerization catalysts include benzoin and vicinal ketaldonyl and acyloin compounds as disclosed in the above Agre patents and various azo-type catalysts such as alpha,alpha'-azodiisobutyronitrile, which are both photopolymerization catalysts as well as thermal polymerization catalysts. When a two stage process is used, the inclusion of a thermal polymerization catalyst is desired for accelerating the subsequent polymerization at an elevated temperature.

Various dyestuffs, plasticizers, lubricants, and other modifiers may be incorporated with the polymerizable liquid organic compounds to obtain certain desired characteristics in the finished product, according to well-known practices in the art. It is ordinarily preferable to start with the polymerizable liquid organic compound in partially polymerized condition, i. e., as a more or less viscous syrup rather than with straight organic liquid. The use of syrup shortens the duration of the process and also reduces any tendency of the lamellae to settle out under the influence of gravity as described hereinbefore.

The examples have illustrated the invention with respect to the making of sheets having integral sheen as such sheets are in great demand and the invention is particularly well adapted for making sheets. Nevertheless, the invention may be carried out in molds of all shapes to produce a wide variety of castings. Although cast sheets and other shaped articles having integral sheen have been made heretofore, no method has been known for preparing such articles having integral sheen in the characteristic fluid-appearing, swirl pattern of the sheets and other articles made according to this invention and such sheets and other articles are new so far as known.

An outstanding advantage of the present invention is that it provides a highly practical and convenient means of obtaining cast synthetic resin sheets or other bodies having integral sheen. A further great advantage of the invention is that it provides a means of obtaining cast synthetic resin sheets and the like having entirely novel integral sheen effects of great attractiveness and which are of such character that sheet after sheet may be readily turned out sufficiently identical so that they may be used in making up matched sets of articles without regard as to whether all the articles of a given set are made from one sheet or several.

As many apparently widely different embodiments of this invention may be made without departing from the spirit and scope thereof, it is to be understood that the invention is not limited to the specific embodiments thereof except as defined in the appended claims.

I claim:

1. Process of preparing cast synthetic resin having integral sheen which comprises suspending light-reflecting lamellae in a polymerizable liquid organic compound adapted to give a polymer solid at ordinary temperatures, introducing the resulting mixture into a mold and inserting into said mold a solid object having at least one dimension less than the least dimension of the interior of the mold and a second dimension appreciably less than a second dimension of the mold, subjecting said mold to polymerization conditions until prior to gelation said polymerizable organic compound attains such viscosity that a pattern formed by creating turbulence therein remains permanent, moving said solid object through said polymerizable organic compound to create a turbulence therein, and thereafter further subjecting said mold to polymerization conditions to complete polymerization of said polymerizable organic compound.

2. Process of preparing cast synthetic resin having integral sheen which comprises suspending light-reflecting lamellae in a polymerizable liquid organic compound adapted to give a polymer solid at ordinary temperatures, introducing the resulting mixture into a mold and inserting into said mold a solid object having at least one dimension less than the least dimension of the interior of the mold and a second dimension appreciably less than a second dimension of the mold, subjecting said mold to polymerization conditions until prior to gelation said polymerizable organic compound attains such viscosity that a pattern formed by creating turbulence therein remains permanent, moving said solid object through said polymerizable organic compound to create a turbulence therein, and thereafter subjecting said mold to an elevated temperature to complete polymerization of said polymerizable organic compound.

3. Process as set forth in claim 2 wherein said mold is subjected to an elevated temperature until prior to gelation said polymerizable organic compound attains such viscosity that a pattern formed by creating a turbulence therein remains permanent.

4. Process as set forth in claim 3 wherein said solid object is made of magnetic material and said solid object is moved through said polymerizable organic liquid by a magnet.

5. Process as set forth in claim 4 wherein said polymerizable liquid organic compound is methyl methacrylate.

6. Process of preparing a cast synthetic resin sheet having integral sheen which comprises suspending light-reflecting lamellae in a polymerizable liquid organic compound adapted to give a polymer solid at ordinary temperatures, introducing the resulting mixture into a cell composed of two plates separated by a compressible gasket and inserting in said cell a solid object having at least one dimension less than the least dimension of the interior of the cell and a second dimension appreciably less than a second dimension of the cell, subjecting said cell to polymerization conditions until prior to gelation said polymerizable organic compound attains such viscosity that a pattern formed by creating turbulence therein remains permanent, moving said solid object through said polymerizable organic compound to create a turbulence therein, and thereafter further subjecting said cell to polymerization conditions to complete polymerization of said polymerizable organic compound.

7. Process of preparing a cast synthetic resin sheet having integral sheen which comprises suspending light-reflecting lamellae in a polymerizable liquid organic compound adapted to give a polymer solid at ordinary temperatures, introducing the resulting mixture into a cell composed of two plates separated by a compressible gasket and inserting in said cell a solid object having at least one dimension less than the least dimension of the interior of the cell and a second dimension appreciably less than a second dimension of the cell, subjecting said cell to polymerization conditions until prior to gelation said polymerizable organic compound attains such viscosity that a pattern formed by creating turbulence therein remains permanent, moving said solid object through said polymerizable organic compound to create a turbulence therein, and thereafter subjecting said cell to an elevated temperature to complete polymerization of said polymerizable organic compound.

8. Process as set forth in claim 7 wherein said cell is subjected to an elevated temperature until prior to gelation said polymerizable organic compound attains such viscosity that a pattern formed by creating a turbulence therein remains permanent.

9. Process as set forth in claim 8 wherein said solid object is made of a magnetic material and said solid object is moved through said polymerizable organic liquid by a magnet.

10. Process as set forth in claim 9 wherein said polymerizable liquid organic compound is methyl methacrylate.

RICHARD EDWARD LEARY.

REFERENCES CITED

The following references are of record in the file of this patent:

UNITED STATES PATENTS

| Number | Name | Date |
|---|---|---|
| 1,886,972 | Payne | Nov. 8, 1932 |
| 2,265,226 | Clewell et al. | Dec. 9, 1941 |
| 2,371,349 | Norton | Mar. 13, 1945 |